(12) United States Patent
Chen et al.

(10) Patent No.: US 12,181,698 B2
(45) Date of Patent: Dec. 31, 2024

(54) OPTICAL FILTER PLATE

(71) Applicant: Xin Yang Sunny Optics Co., Ltd., Henan (CN)

(72) Inventors: Ce Chen, Henan (CN); Weihong Ding, Henan (CN); Yeqing Fang, Henan (CN); Wei Yang, Henan (CN); Niangong Xiao, Henan (CN)

(73) Assignee: Xin Yang Sunny Optics Co., Ltd., Henan (CN)

( * ) Notice: Subject to any disclaimer, the term of this patent is extended or adjusted under 35 U.S.C. 154(b) by 549 days.

(21) Appl. No.: 17/517,047

(22) Filed: Nov. 2, 2021

(65) Prior Publication Data
US 2022/0120951 A1    Apr. 21, 2022

Related U.S. Application Data

(63) Continuation of application No. PCT/CN2019/130577, filed on Dec. 31, 2019.

(30) Foreign Application Priority Data

Jun. 5, 2019 (CN) .......................... 201910487270.2

(51) Int. Cl.
*G02B 5/28* (2006.01)
(52) U.S. Cl.
CPC .................... *G02B 5/281* (2013.01)
(58) Field of Classification Search
CPC ....................................... G02B 5/281
USPC ....................................... 359/359
See application file for complete search history.

(56) References Cited

U.S. PATENT DOCUMENTS

| | | | |
|---|---|---|---|
| 9,989,684 B2 | 6/2018 | Sprague | |
| 10,168,459 B2 | 1/2019 | Ockenfuss | |
| 11,828,961 B2 | 11/2023 | Chen et al. | |
| 2016/0238759 A1* | 8/2016 | Sprague | ............. C23C 14/0652 |
| 2018/0149781 A1 | 5/2018 | Ockenfuss et al. | |
| 2020/0408977 A1 | 12/2020 | Eisenhammer | |

FOREIGN PATENT DOCUMENTS

| | | | |
|---|---|---|---|
| CN | 103018812 A | * | 4/2013 |
| CN | 103018812 B | | 5/2015 |
| CN | 105137518 A | | 12/2015 |

(Continued)

OTHER PUBLICATIONS

Translation of CN 103018812 (Year: 2024).*

(Continued)

*Primary Examiner* — Jerry L Brooks
(74) *Attorney, Agent, or Firm* — Reising Ethington P.C.

(57) ABSTRACT

An optical filter that includes a substrate and a first set of films disposed on a first surface of the substrate, wherein the first set of films includes a high refractive index film layer, a low refractive index film layer, and a matching film layer. A material of the matching film layer includes a nitrogen-doped silicon germanium mixture having a chemical formula $Si_xGe_{1-x}N_y$, where $0 \leq x \leq 1$, and $0 < y \leq 0.1$. In a wavelength range of 780 nm to 3000 nm, a refractive index of the high refractive index film layer is greater than a refractive index of the low refractive index film layer, and a refractive index of the matching film layer is not equal to a refractive index of its adjacent film layer.

13 Claims, 3 Drawing Sheets

(56) References Cited

FOREIGN PATENT DOCUMENTS

| | | | |
|---|---|---|---|
| CN | 105511004 A | 4/2016 | |
| CN | 107209305 A | 9/2017 | |
| CN | 108121026 A | 6/2018 | |
| CN | 108897085 A | 11/2018 | |
| CN | 110109210 A | 8/2019 | |
| CN | 210015252 U | 2/2020 | |
| DE | 102015208705 A1 | 2/2016 | |
| DE | 202017100512 U1 * | 3/2017 | |
| DE | 102017004828 A1 | 11/2018 | |
| EP | 3330753 A1 * | 6/2018 | ......... C23C 14/0057 |
| JP | 2018504635 A | 2/2018 | |
| JP | 2018155962 A | 10/2018 | |
| JP | 2020501182 A | 1/2020 | |
| KR | 20180062389 A | 6/2018 | |
| WO | 2017217555 A1 | 12/2017 | |
| WO | 2018102219 A1 | 6/2018 | |

OTHER PUBLICATIONS

Translation of EP 33330753 (Year: 2024).*
Translation of DE202017100521 (Year: 2024).*
Supplementary European Search Report corresponding to European Application No. EP19931930, dated Nov. 15, 2022, 9 pages.
English translation of Japanese Office Action corresponding to application 2021-564099, dated Jul. 18, 2023, 4 pages.
Japanese Office Action corresponding to Japanese Application No. 2021-564099 with machine translation of portions, dated Nov. 7, 2022, 5 pages.
International Search Report corresponding to International Application No. PCT/CN2019/130577, dated Mar. 26, 2020, 6 pages.
Written Opinion corresponding to International Application No. PCT/CN2019/130577, dated Mar. 26, 2020, 5 pages.
English translation of Korean Office Action corresponding to application 10-2021-7034652, dated Jan. 2, 2024, 8 pages.
English translation of Chinese Office Action corresponding to application 201910487270.2, dated Jan. 2, 2024, 7 pages.

* cited by examiner

OPTICAL FILTER PLATE

CROSS-REFERENCE TO RELATED APPLICATIONS

The present patent application is a continuation of International Application No. PCT/CN2019/130577, filed on Dec. 31, 2019, which claims priority to Chinese Patent Application, with the Application No. 201910487270.2 and the title "Optical Filter", filed before the China National Intellectual Property Administration (CNIPA) on Jun. 5, 2019. Both of the aforementioned patent applications are hereby incorporated by reference in their entireties.

TECHNICAL FIELD

The present disclosure relates to the field of optical elements, and more particularly, to a near infrared optical filter.

BACKGROUND

The near-infrared narrow-band optical filter can be applied to a face recognition system, a gesture recognition system, a laser radar, a smart appliance, and the like. When the above-mentioned systems or devices operate, the near-infrared narrow-band optical filter often receives light incident at an oblique angle.

The near-infrared narrow-band optical filter generally includes a substrate, and both sides of the substrate are coated with a multilayer film to form a set of films. The near-infrared narrow-band optical filter has a passband corresponding to light. A majority of light corresponding to the passband can pass through the near-infrared narrow-band optical filter, and a majority of light corresponding to a non-passband is cut off. There is a need in the art for an optical filter having excellent optical filter properties to improve imaging quality.

SUMMARY

To address or partially address the above-mentioned drawbacks of the prior art, examples of the present disclosure propose an optical filter and a method for manufacturing the optical filter. Examples of the present disclosure also provide an optical system.

Examples of the present disclosure provide an optical filter including a substrate and a first set of films disposed on a first surface of the substrate, wherein the first set of films includes a high refractive index film layer, a low refractive index film layer, and a matching film layer. A material of the matching film layer includes a nitrogen-doped silicon germanium mixture having a chemical formula $Si_xGe_{1-x}N_y$, where $0 \leq x \leq 1$, and $0 < y \leq 0.1$. In a wavelength range of 780 nm to 3000 nm, a refractive index of the high refractive index film layer is greater than a refractive index of the low refractive index film layer, and a refractive index of the matching film layer is not equal to a refractive index of its adjacent film layer.

In one embodiment, the optical filter has a passband within a wavelength range of 780 nm to 1200 nm, and when an incident angle of light changes from 0° to 30°, a drift amount of a center wavelength of the passband is not greater than 16 nm.

In one embodiment, the passband of the optical filter has a center wavelength corresponding to a p light and a center wavelength corresponding to a s light, and when the incident angle of light is 30°, a drift between the center wavelength corresponding to the p light and the center wavelength corresponding to the s light is not greater than 5 nm.

In one embodiment, an average transmittance of the passband of the optical filter is not less than 93%.

In one embodiment, the refractive index of the high refractive index film layer is greater than 3, the refractive index of the low refractive index film layer is less than 3, and the refractive index of the matching film layer is between 1.7 and 4.5, in a wavelength range of 780 nm to 1200 nm.

In one embodiment, the nitrogen-doped silicon germanium mixture may further be doped with hydrogen and have a chemical formula $Si_xGe_{1-x}N_y:H_z$, where $0 \leq x \leq 1$, $0 < y \leq 1$, and $z \leq 1$, at least a part of which is an amorphous hydrogenated nitrogen-doped silicon germanium mixture $\alpha\text{-}Si_xGe_{1-x}N_y:H_z$.

In one embodiment, the nitrogen-doped silicon germanium mixture further includes an auxiliary component including one or more of oxygen, boron, or phosphorus, and a ratio of a number of each atom in the auxiliary component to a number of silicon atoms is less than 10%.

In one embodiment, a material of the high refractive index film layer includes $Si_wGe_{1-w}:H_v$, where $0 \leq w \leq 1$, and $0 \leq v \leq 1$.

In one embodiment, a material of the low refractive index film layer includes a mixture of one or more of $SiO_2$, $Si_3N_4$, $Ta_2O_5$, $Nb_2O_5$, $TiO_2$, $Al_2O_3$, SiCN, or SiC.

In one embodiment, the substrate further includes a second surface facing away from the first surface. The optical filter further includes a second set of films disposed on the second surface of the substrate. The second set of films is a set of longwave pass films or a set of wideband pass films, and the first set of films is a set of narrowband pass films. A passband of the second set of films covers a passband of the first set of films.

In one embodiment, a sum of a thickness of the first set of films and a thickness of the second set of films is less than 12 μm.

In one embodiment, the second set of films is the set of longwave pass films. In a wavelength range of 350 nm to 1200 nm, the set of narrowband pass films has a passband, the set of longwave pass films has a passband and a cut-off band, and the passband of the set of longwave pass films covers the passband of the set of narrowband pass films. A blocking of the cut-off band of the set of longwave pass films is not lower than a blocking of a corresponding band of the set of narrowband pass films.

In one embodiment, the second set of films is the set of wideband pass films. In a wavelength range of 780 nm to 1200 nm, the set of narrowband pass films has a passband, the set of wideband pass films has a passband, and the passband of the set of wideband pass films covers the passband of the set of narrowband pass films. In a wavelength range less than 780 nm, an average blocking of the set of wideband pass films is not lower than an average blocking of the set of narrowband pass films.

In one embodiment, along a direction away from the substrate, the first set of films has a structure in one of the following forms: $(L_3\text{-}L_1\text{-}L_3\text{-}L_2)^s\text{-}L_3\text{-}L_1$; $(L_1\text{-}L_3)^2\text{-}(L_2\text{-}L_3\text{-}L_1\text{-}L_3)^s\text{-}L_1\text{-}L_3$; $(L_1\text{-}L_3)^s\text{-}(L_2\text{-}(L_1\text{-}L_3)^p\text{-}L_1\text{-}L_2)^q\text{-}(L_1\text{-}L_3)^r\ L_1$; $(L_3\text{-}L_1)^s\text{-}(L_2\text{-}(L_1\text{-}L_3)^p\text{-}L_1\text{-}L_2)^q\text{-}(L_3\text{-}L_1)^r\ L_3\text{-}L_1\text{-}(L_2\text{-}(L_1\text{-}L_3)^t\text{-}L_1\text{-}L_2)^n$; or $(L_3\text{-}L_1)^s\text{-}(L_3\text{-}L_1)^r\ L_3\text{-}(L_2\text{-}(L_1\text{-}L_3)^p\text{-}L_1\text{-}L_2)^q\text{-}(L_3\text{-}L_1)^r\ L_3\text{-}(L_2\text{-}(L_1\text{-}L_3)^t\text{-}L_1\text{-}L_2)^n\text{-}(L_3\text{-}L_1)^r$. In the structural of the first set of films, $L_1$ represents the high refractive index film layer, $L_3$ represents the low refractive index film layer, $L_2$ represents the matching film layer, p, q, r, and s represent a number of repetitions of a structure in parentheses, wherein p, q, r, and s are integers greater than or equal to 0.

According to a second aspect, an example of the present disclosure provides an optical system which may include an infrared image sensor and the aforementioned optical filter. The optical filter is arranged on a photosensitive side of the infrared image sensor.

Examples of the present disclosure provide an optical filter. A first set of films of the optical filter includes a high refractive index film layer, a matching film layer, and a low refractive index film layer. A material of the matching film layer is a nitrogen-doped silicon germanium mixture to be suitable for matching the high refractive index film layer or the low refractive index film layer. Specifically, by doping nitrogen atoms in a silicon-germanium mixture, the bonding manner of germanium element (or silicon element) to other elements is changed, and the mole number of the nitrogen element is less than 10% of the sum of the mole number of the silicon element and the mole number of the germanium element. Different nitrogen doping content has different effects on the refractive index of the material. For details, see the graph attached for the relationship between refractive index and nitrogen doping. Depending on different product or customer requirements on optical specifications, the amount of nitrogen doping is adjusted to produce a suitable medium refractive index material for the material of the F-P structure or the material of the matching film layer. By matching the matching film layer with other film layers, the optical filter provided in the present disclosure has a passband with a small change in bandwidth for incident light incident at different angles. An optical system provided with such optical filter has a high signal-to-noise ratio, and a high quality of data. In other words, under the same signal-to-noise ratio requirements, other components of the optical system may have a higher design margin.

BRIEF DESCRIPTION OF THE DRAWINGS

Other features, objects, and advantages of the present disclosure will become more apparent by reading the detailed description of the non-limiting examples with reference to the accompanying drawings.

DETAILED DESCRIPTION OF EMBODIMENTS

Figure 1:
FIG. 1 shows a schematic structural diagram of an optical filter according to an example of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first side discussed below may also be referred to as a second side without departing from the teachings of the present disclosure, and vice versa.

In the accompanying drawings, the thickness, size and shape of the component have been somewhat adjusted for the convenience of explanation. The accompanying drawings are merely illustrative and not strictly drawn to scale. For example, the ratio between the thickness and the length of the first set of films is not in accordance with the ratio in actual production. As used herein, the terms "approximately," "about," and similar terms are used as approximate terms, not as terms representing degree, and are intended to describe inherent deviations in the value that will be recognized, measured or calculated by those of ordinary skill in the art.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including engineering terms and scientific and technological terms) used herein have the same meaning as commonly understood by those of ordinary skill in the art to which the present disclosure belongs. It will be further understood that terms, those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. In addition, unless clearly defined or contradictory to the context, the specific steps included in the method described in the present disclosure are not necessarily limited to the described order, and can be executed in any order or in parallel. The present disclosure will be described in detail below with reference to the accompanying drawings and in combination with the examples.

FIG. 1 shows a schematic structural diagram of an optical filter according to an example of the present disclosure. Referring to FIG. 1, an optical filter 5 according to an example of the present disclosure includes a substrate 51 and a first set of films 52. The substrate 51 is a transparent substrate including an upper surface and a lower surface facing away from each other. The upper surface of the substrate 51 is a first surface and the lower surface is a second surface, and the first set of films 52 is disposed on the first surface of the substrate 51. The first set of films 52 includes a high refractive index film layer, a low refractive index film layer, and a matching film layer.

In an exemplary embodiment, the shape of the substrate 51 has other optical structures, such as a prism. The light entrance surface of the substrate 51 may be considered as the first surface and the light exit surface may be considered as the second surface.

In an exemplary embodiment, the material of the matching film layer includes a hydrogenated nitrogen-doped silicon germanium mixture, and the hydrogenated nitrogen-doped silicon germanium mixture has the chemical formula $Si_xGe_{1-x}N_y$:H, where $0 \leq x \leq 1$, and $0 < y \leq 0.1$. Exemplarily, the nitrogen-doped silicon germanium mixture has the chemical formula $Si_xGe_{1-x}N_y$, where $0 \leq x \leq 0.5$, and $0 < y < 0.1$. For example, the nitrogen-doped silicon germanium mixture has the chemical formula $Si_{0.5}Ge_{0.5}N_{0.05}$. Exemplarily, $0 \leq x \leq 0.3$, and $0 < y < 0.1$, for example the chemical formula of the nitrogen-doped silicon germanium mixture is $Si_{0.1}Ge_{0.9}N_{0.02}$:$H_{0.7}$. Exemplarily, the chemical formula of the nitrogen-doped silicon germanium mixture is $SiN_{0.1}$:H.

In an exemplary embodiment, the material of at least a part of the matching film layer is an amorphous nitrogen-doped silicon germanium mixture: $\alpha$-$Si_xGe_{1-x}N_y$. Exemplarily, the volume of the amorphous nitrogen-doped silicon germanium mixture constitutes 20% of the volume of the matching film layer. The matching film layer is formed by accumulation of molecular layers, exemplarily, the matching film layer includes a plurality of amorphous nitrogen-doped silicon germanium mixture layers and a plurality of single crystal nitrogen-doped silicon germanium mixture layers, wherein the ratio of the sum of the thicknesses of all the amorphous nitrogen-doped silicon germanium mixture layers to the thickness of the matching film layer is between 16% and 20%. Exemplarily, the material of the matching film layer includes one or more of a polycrystalline nitrogen-doped silicon germanium mixture, a microcrystalline nitrogen-doped silicon germanium mixture, and a nanocrystalline nitrogen-doped silicon germanium mixture. The optical constant of the matching film layer is suitable for accurately setting in a large range, so that the states of the P light and the s light passing therethrough can be kept stable in a complex operating environment, and the drift between the center wavelength of the p light and the center wavelength of the s light of the first set of films is small.

In an exemplary embodiment, in the wavelength range of 780 nm to 1200 nm, the refractive index of the high refractive index film layer is greater than the refractive index of the low refractive index film layer, and the refractive index of the matching film layer is not equal to the refractive index of the film layer adjacent thereto.

The optical filter provided in an example of the present disclosure can accurately set an optical constant to achieve a specific optical characteristic within a wide range. For example, a narrow-band optical filter with certain bandwidth. The optical filters provided herein can be used in photovoltaic cells to achieve passage of a particular optical band gap, or to achieve high absorption or high cutoff of light at a particular wavelength band, etc.

In an exemplary embodiment, the optical filter 5 has a passband corresponding to the wavelength range of 780 nm to 1200 nm, and when the incident angle of the light changes from 0° to 30°, the drift amount of the center wavelength of the passband is not greater than 16 nm. Exemplarily, when the incident angle of the light changes from 0° to 30°, the drift amount of the center wavelength of the passband is not greater than 13 nm, for example, not greater than 11 nm. It is possible to increase the bandwidth of the passband by controlling the amount of drift of the center wavelength and to improve the signal-to-noise ratio.

In an exemplary embodiment, the passband of the optical filter 5 has a center wavelength corresponding to the p light and a center wavelength corresponding to the s light, and when the incident angle of the light is 30°, the drift between the center wavelength corresponding to the p light and the center wavelength corresponding to the s light is not greater than 5 nm. Exemplarily, the drift between the center wavelength of the p light and the center wavelength of the s light is not greater than 4.2 nm. By controlling the amount of drift between the center wavelength of the p light and the center wavelength of the s light, the bandwidth of the passband can be broadened, so that devices and circuits using the optical filter have a higher design margin.

In an exemplary embodiment, an average transmittance of the passband of the optical filter 5 is not less than 93%. Exemplarily, the average transmittance of the passband of the optical filter 5 is not less than 94%. The average transmittance of the passband is controlled so that the intensity of the light in the wavelength band corresponding to the passband among the light passing through the optical filter 5 is high, and the signal-to-noise ratio may be improved.

In an exemplary embodiment, in the wavelength range from 780 nm to 1200 nm, a refractive index of the high refractive index film layer is greater than 3, a refractive index of the low refractive index film layer is less than 3, and a refractive index of the matching film layer is between 1.7 and 4.5. Exemplarily, the refractive index of the high refractive index film layer is greater than 4, the refractive index of the matching layer is between 3 and 4.5, and the refractive index of the low refractive index film layer is less than 3. Exemplarily, the refractive index of the high refractive index film layer is 4.5, the refractive index of the low refractive index film layer is 2.8, and the plurality of matching film layers each has a different refractive index, for example, the refractive indexes are 3, 3.5, and 4, respectively. By controlling the refractive index of the matching film layer, the refractive index of the high refractive index film layer, and the refractive index of the low-refractive-index film layer, the state in which light passes through each film layer is controlled, for example, the difference in optical characteristics of the state in which p light and s light pass through is small, so that specific optical characteristics of the first set of films 52 are realized.

In an exemplary embodiment, the refractive index of the matching film layer is smaller than the refractive index of the high refractive index film layer, and the refractive index of the matching film layer is greater than the refractive index of the low refractive index film layer.

In an exemplary embodiment, the nitrogen-doped silicon germanium mixture is a hydrogenated nitrogen-doped silicon germanium mixture, and the hydrogenated nitrogen-doped silicon germanium mixture has the chemical formula $Si_xGe_{1-x}N_y$:$H_z$, where $0 \leq x \leq 1$, $0 < y \leq 0.1$, and $z \leq 1$. Exemplarily, in $Si_xGe_{1-x}N_y$:$H_z$, $0 \leq x \leq 0.5$, $0 < y < 0.1$, and $z \leq 1$. For example, the chemical formula of the hydrogenated nitrogen-doped silicon germanium-based material is $Si_{0.5}Ge_{0.5}N_{0.05}$:$H_{0.5}$.

In an exemplary embodiment, the chemical formula of the hydrogenated nitrogen-doped silicon germanium-based material is $Si_xGe_{1-x}N_y$:$H_z$, where $0 \leq x \leq 0.3$, $0 < y < 0.1$, and $0.8 < z \leq 1$. Exemplarily, the chemical formula of the hydrogenated nitrogen-doped silicon germanium-based material is $Si_{0.1}Ge_{0.9}N_{0.02}$:$H_{0.7}$. Exemplarily, the chemical formula of the hydrogenated nitrogen-doped silicon germanium-based material is $SiN_{0.1}$:H, i.e., a hydrogenated nitrogen-doped silicon-based material.

In an exemplary embodiment, at least a part of the hydrogenated nitrogen-doped silicon germanium mixture is an amorphous hydrogenated nitrogen-doped silicon germanium mixture: $\alpha$-$Si_xGe_{1-x}N_y$:$H_z$.

In an exemplary embodiment, the nitrogen-doped silicon germanium mixture further includes an auxiliary component including one or more of nitrogen, boron, or phosphorus, wherein the ratio of a number of each atom in the auxiliary component to a number of silicon atoms is less than 0.1.

Figure 2A:
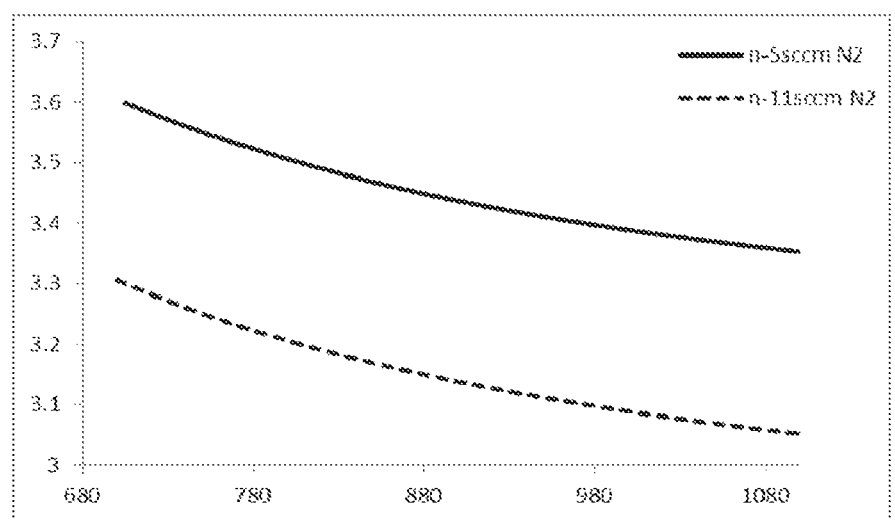
FIGS. 2a and 2b show refractive index curves and an extinction coefficient curve, respectively, of a matching layer according to an example of the present disclosure.
Figure 2B:
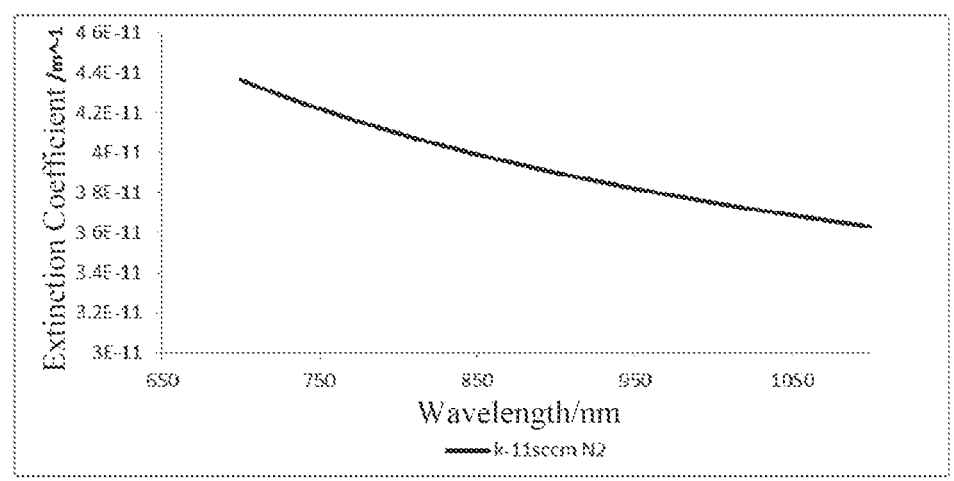

Referring to FIGS. 2a and 2b, the conditional expression a<0.1b is satisfied. It is possible to use a relatively small amount of nitrogen elements and auxiliary components, and change in a relatively narrow range to achieve a relatively large range of refractive index adjustment. The physicochemical properties of the corresponding matching film layers are stable and can have a large range of specifically specified optical properties.

In an exemplary embodiment, the material of the high refractive index film layer includes $Si_wGe_{1-w}$:$H_v$, where $0 \leq w \leq 1$, and $0 \leq v \leq 1$. Exemplarily, w is 0.2 or 0.37.

In an exemplary embodiment, the material of the low refractive index film layer includes a mixture of one or more of $SiO_2$, $Si_3N_4$, $Ta_2O_5$, $Nb_2O_5$, $TiO_2$, $Al_2O_3$, SiCN, SiC.

In an exemplary embodiment, the material of the substrate includes glass. Specifically, D263T, AF32, Eagle XG, H-ZPK5, H-ZPK7, and the like may be used.

In an exemplary embodiment, the substrate further includes a second surface facing away from the first surface, and the optical filter further includes a second set of films disposed on the second surface of the substrate. The second set of films is a set of longwave pass films or a set of wideband pass films, and the first set of films is a set of narrowband pass films. The passband of the second set of films covers the passband of the first set of films. By providing the second set of films, it is possible to make the optical filter 5 have a better antireflection and cutoff effect on light, and to make the light transmitted through the optical filter 5 have a higher signal-to-noise ratio.

In an exemplary embodiment, the sum of the thickness of the first set of films and the thickness of the second set of films is less than 15 μm, for example, less than 12 μm. Controlling the thicknesses of the two sets of films can make the offset corresponding to the center wavelength of the p light and the center wavelength corresponding to the s light small, and can reduce the manufacturing cost.

In an exemplary embodiment, the second set of films is a set of longwave pass films. In a wavelength range of 350 nm to 1200 nm, the set of narrowband pass films has a passband, the set of longwave pass films has a passband and a cut-off band, and the passband of the set of longwave pass films covers the passband of the set of narrowband pass films. The blocking of the cut-off band of the set of longwave pass films is not lower than the blocking of the corresponding band of the set of narrowband pass films. By controlling the blocking of the set of longwave pass films, the blocking of the optical filter 5 can be improved better, and the transmittance of the light in the corresponding wavelength band is reduced, so that the noise signal in the image formed by the light passing through the optical filter 5 is weak.

In an exemplary embodiment, the second set of films is a set of wideband pass films. In a wavelength range of 780 nm to 1200 nm, the set of narrowband pass films has a passband, the set of wideband pass films has a passband, and the passband of the set of wideband pass films covers the passband of the set of narrowband pass films. In a wavelength range less than 780 nm, the average blocking of the set of wideband pass films is not lower than the average blocking of the set of narrowband pass films. By controlling the blocking of the set of wideband pass films, the blocking of the optical filter 5 can be improved better, and the transmittance of the light in the corresponding band is reduced, so that the noise signal in the image formed by the light passing through the optical filter 5 is weak.

In an exemplary embodiment, along a direction away from the substrate, the structure of the first set of films is one of the following structures: $(L_3-L_1-L_3-L_2)^s-L_3-L_1$; $(L_1-L_3)^2-(L_2-L_3-L_1-L_3)^s-L_1-L_3$; $(L_1-L_3)^s(L_2-(L_1-L_3)^p-L_1-L_2)^q-(L_1-L_3)^r$ $L_1$; $(L_3-L_1)^s(L_2-(L_1-L_3)^p-L_1-L_2)^q-(L_3-L_1)^r$ $L_3-L_1-(L_2-(L_1-L_3)^t-L_1-L_2)^n$; and $(L_3-L_1)^s-(L_3-L_1)^r$ $L_3-(L_2-(L_1-L_3)^p-L_1-L_2)^q-(L_3-L_1)^r$ $L_3-(L_2-(L_1-L_3)^{t-L}{}_1-L_2)^n-(L_3-L_1)^r$. In the structure of the first set of films, $L_1$ represents a high refractive index film layer, $L_3$ represents a low refractive index film layer, $L_2$ represents a matching film layer, and p, q, r, and s represent the number of repetitions of the structure in parentheses, wherein p, q, r, and s are integers greater than or equal to 0.

Figure 3:
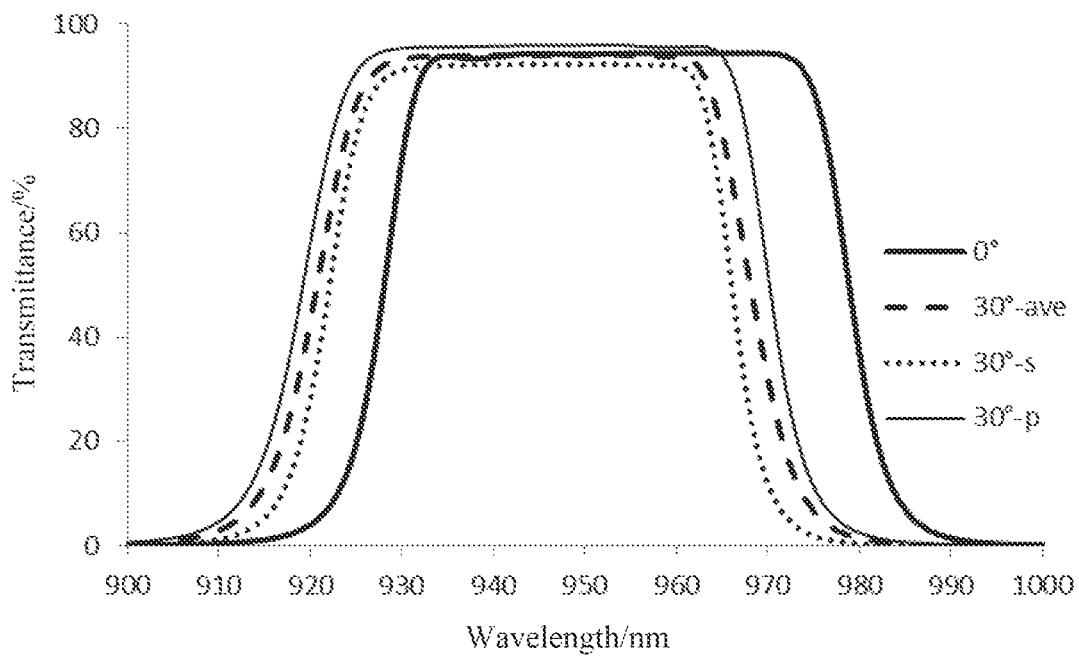
FIG. 3 shows transmission versus wavelength curves according to Example 1 of the present disclosure.
Figure 4:
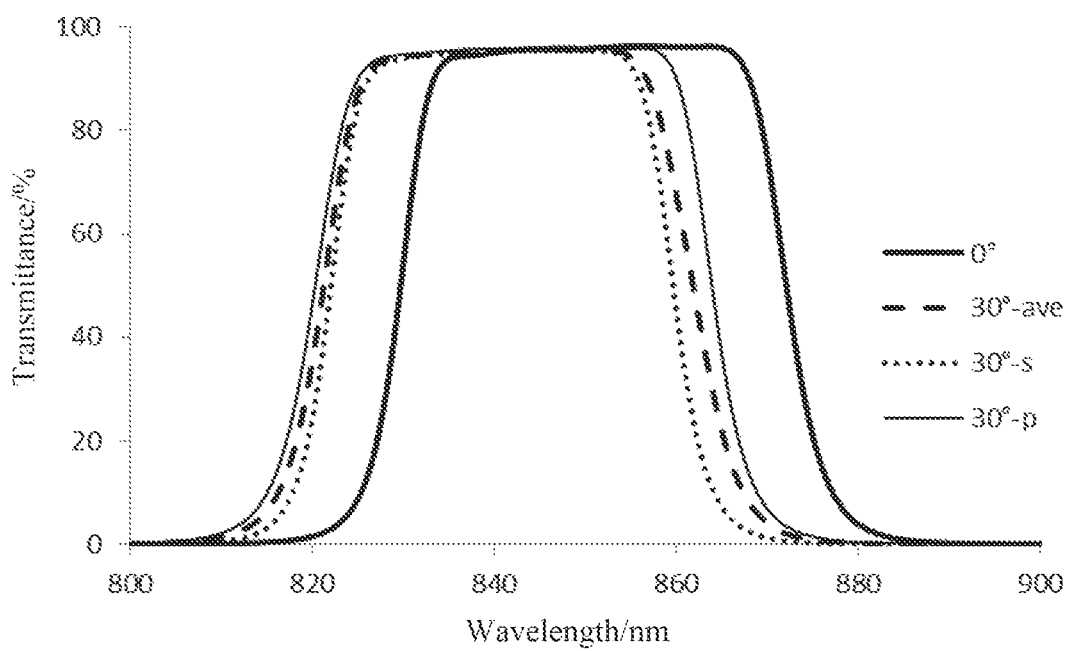
FIG. 4 shows transmission versus wavelength curves according to Example 2 of the present disclosure.
Figure 5:
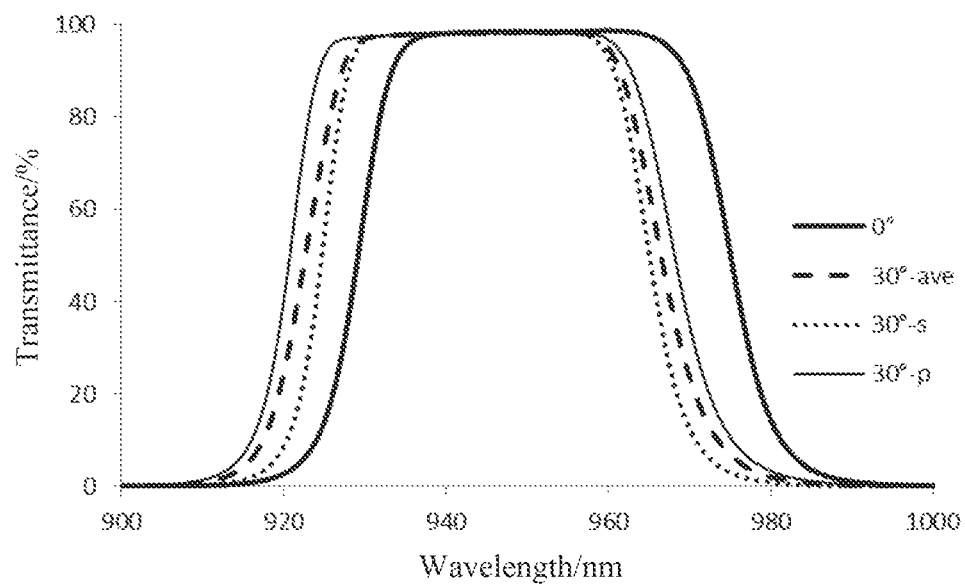
FIG. 5 shows transmission versus wavelength curves according to Example 3 of the present disclosure.

Three examples provided herein are described in detail below in connection with FIGS. 3 to 5.

Example 1

The optical filter 5 of the present example includes a substrate 51. A first set of films 52 formed by sputtering coating is disposed on a first surface of the substrate 51. The first set of films 52 may include a set of narrowband pass films provided in Table 1, wherein the $1^{st}$ layer is a layer closest to the substrate 51. A second set of films 53 formed by sputtering coating is disposed on a second surface of the substrate 51. The second set of films 53 may include a set of longwave pass films provided in Table 2, wherein the $1^{st}$ layer is a layer closest to the substrate 51. Referring to FIG. 3, when the incident angle of the light changes from 0° to 30°, the drift amount of the center wavelength of the passband of the optical filter 5 is not greater than 12 nm.

Table 1 of the present disclosure provides a set of narrowband pass films. The materials of the layers in the same column in Table 1 are the same. In Table 1, reference numerals 1-22 denotes the order in which each layer of the first set of films 52 is stacked in a direction away from the substrate 51. For example, "1" denotes the $1^{st}$ layer, which is the layer closest to the substrate 51 as described above.

TABLE 1

Layer structure of a set of narrowband pass films (unit of thickness: nm)

| Material | $SiO_2$ | $\alpha$-Si:H | $SiO_2$ | $\alpha$-$SiN_y$:$H_z$ |
|---|---|---|---|---|
| Layer | 1 | 2 | 3 | 4 |
| Thickness | 20.65 | 255.43 | 294.11 | 174.64 |
| Layer | 5 | 6 | 7 | 8 |
| Thickness | 66.55 | 411.74 | 86.75 | 28.88 |
| Layer | 9 | 10 | 11 | 12 |
| Thickness | 165.62 | 671.41 | 86.3 | 50.71 |
| Layer | 13 | 14 | 15 | 16 |
| Thickness | 181.11 | 647.69 | 136.86 | 115.56 |
| Layer | 17 | 18 | 19 | 20 |
| Thickness | 135.2 | 390.23 | 168.42 | 42.93 |
| Layer | 21 | 22 | | |
| Thickness | 177.22 | 260.6 | | |

In the set of narrowband pass films, the material of the high refractive index film layer is α-Si:H, the material of the low refractive index film layer is $SiO_2$, and the material of the matching film layer is α-$SiN_y$:$H_z$.

Table 2 provides a set of longwave pass films. The materials of the layers in the same column in Table 2 are the same. In Table 2, reference numerals 1-27 denotes the order in which each layer of the second set of films 53 is stacked in a direction away from the substrate 51. For example, "1"

substrate 51. Referring to FIG. 4, when the incident angle of the light changes from 0° to 30°, the drift amount of the center wavelength of the passband of the optical filter 5 is less than 13 nm.

Table 3 provides a set of narrowband pass films. In Table 3, reference numerals 1-23 denotes the order in which each layer of the first set of films 52 is stacked in a direction away from the substrate 51. For example, "1" denotes the 1$^{st}$ layer, which is the layer closest to the substrate 51 as described above.

TABLE 3

Layer structure of a set of narrowband pass films (unit of thickness: nm)

| Layer | 1 | 2 | 3 | 4 | 5 | 6 |
|---|---|---|---|---|---|---|
| Material | $SiO_2$ | α-Si:H | $SiO_2$ | α-Si:H | $SiO_2$ | α-Si:H |
| Thickness | 1040.47 | 249.56 | 55.64 | 40.55 | 172.3 | 231.59 |
| Layer | 7 | 8 | 9 | 10 | 11 | 12 |
| Material | α-$GeN_y$:$H_z$ | $SiO_2$ | α-Si:H | $SiO_2$ | α-$GeN_y$:$H_z$ | $SiO_2$ |
| Thickness | 260.76 | 198.58 | 38.27 | 105.65 | 565.76 | 140.38 |
| Layer | 13 | 14 | 15 | 16 | 17 | 18 |
| Material | α-Si:H | $SiO_2$ | α-$GeN_y$:$H_z$ | α-Si:H | $SiO_2$ | α-Si:H |
| Thickness | 35.96 | 210.57 | 245.64 | 239.15 | 158.07 | 62.86 |
| Layer | 19 | 20 | 21 | 22 | 23 | |
| Material | $SiO_2$ | α-Si:H | $SiO_2$ | α-Si:H | $SiO_2$ | |
| Thickness | 31.02 | 252.57 | 330.37 | 116.58 | 509.66 | | denotes the 1$^{st}$ layer, which is the layer closest to the substrate 51 as described above.

TABLE 2

Layer structure of a set of longwave pass films (unit of thickness: nm)

| Material | $SiO_2$ | Si:H | $SiO_2$ | Si:H | $SiO_2$ | Si:H |
|---|---|---|---|---|---|---|
| Layer | 1 | 2 | 3 | 4 | 5 | 6 |
| Thickness | 170.6 | 27.72 | 82.96 | 32.7 | 132.4 | 40.69 |
| Layer | 7 | 8 | 9 | 10 | 11 | 12 |
| Thickness | 101.55 | 31.19 | 119.83 | 37.6 | 122.7 | 34.77 |
| Layer | 13 | 14 | 15 | 16 | 17 | 18 |
| Thickness | 116.51 | 34.77 | 118.47 | 30.3 | 127.7 | 42.24 |
| Layer | 19 | 20 | 21 | 22 | 23 | 24 |
| Thickness | 123.15 | 26.47 | 105.93 | 42.1 | 126.9 | 35.13 |
| Layer | 25 | 26 | 27 | | | |
| Thickness | 74.04 | 22.29 | 94.59 | | | |

The optical filter 5 is thin in thickness, easy to manufacture, high in transmission rate of the passband, and high in intensity of light required in light passing through the optical filter 5.

Example 2

The optical filter 5 provided in the present example includes a substrate 51. A first set of films 52 formed by sputtering coating is disposed on a first surface of the substrate 51, and second set of films 53 formed by evaporation coating is disposed on a second surface of the substrate 51. The first set of films 52 may include a set of narrowband pass films provided in Table 3, wherein the 1$^{st}$ layer is a layer closest to the substrate 51. The second set of films 53 may include a set of longwave pass films provided in Table 4, wherein the 1$^{st}$ layer is a layer closest to the In the set of narrowband pass films, the material of the high refractive index film layer is α-Si:H, the material of the low refractive index film layer is $SiO_2$, and the material of the matching film layer is α-$GeN_y$:$H_z$. Layer 11 is a matching film layer, and the rest layers are disposed approximately symmetrically with layer 11.

Table 4 provides a set of longwave pass films. The materials of the layers in the same column in Table 4 are the same. In Table 4, reference numerals 1-47 denotes the order in which each layer of the second set of films 53 is stacked in a direction away from the substrate 51. For example, "1" denotes the 1$^{st}$ layer, which is the layer closest to the substrate 51 as described above.

TABLE 4

Layer structure of a set of longwave pass films (unit of thickness: nm)

| Material | $SiO_2$ | Si:H | $SiO_2$ | Si:H | $SiO_2$ | Si:H |
|---|---|---|---|---|---|---|
| Layer | 1 | 2 | 3 | 4 | 5 | 6 |
| Thickness | 134.4 | 72.6 | 90.3 | 67.45 | 120.98 | 77.91 |
| Layer | 7 | 8 | 9 | 10 | 11 | 12 |
| Thickness | 136 | 83.4 | 97.5 | 70.9 | 270.45 | 75.64 |
| Layer | 13 | 14 | 15 | 16 | 17 | 18 |
| Thickness | 111.7 | 67.6 | 101.7 | 197.77 | 116.51 | 74.86 |
| Layer | 19 | 20 | 21 | 22 | 23 | 24 |
| Thickness | 118.7 | 75.8 | 120.1 | 76.06 | 103.28 | 42.14 |
| Layer | 25 | 26 | 27 | 28 | 29 | 30 |
| Thickness | 133.6 | 83.1 | 131.4 | 83.54 | 133.68 | 85.88 |
| Layer | 31 | 32 | 33 | 34 | 35 | 36 |
| Thickness | 133.1 | 84.1 | 135.3 | 84.91 | 135.75 | 84.61 |
| Layer | 37 | 38 | 39 | 40 | 41 | 42 |
| Thickness | 87.1 | 75.6 | 124.5 | 80.29 | 129.71 | 82.58 |
| Layer | 43 | 44 | 45 | 46 | 47 | - |
| Thickness | 136.4 | 87.5 | 130.1 | 77.82 | 103.24 | - |

The passband width of the optical filter 5 is relatively narrow, an offset between the center wavelength of the p light and the center wavelength of the s light is relatively small, and blocking of the cut-off region is relatively high.

Example 3

The optical filter 5 provided in the present example includes a substrate 51. A first set of films 52 formed by sputtering coating is disposed on a first surface of the substrate 51, and second set of films 53 formed by sputtering coating is disposed on a second surface of the substrate 51. The first set of films 52 may include a set of narrowband pass films provided in Table 5, wherein the $1^{st}$ layer is a layer closest to the substrate 51. The second set of films 53 may include a set of wideband pass films provided in Table 6, wherein the $1^{st}$ layer is a layer closest to the substrate 51. Referring to FIG. 5, when the incident angle of the light changes from 0° to 30°, the drift amount of the center wavelength of the passband of the optical filter 5 is less than 11 nm.

Table 5 provides a set of narrowband pass films. In Table 5, reference numerals 1-30 denotes the order in which each layer of the first set of films 52 is stacked in a direction away from the substrate 51. For example, "1" denotes the $1^{st}$ layer, which is the layer closest to the substrate 51 as described above.

TABLE 5

Layer structure of a set of narrowband pass films (unit of thickness: nm)

| Material | $Si_wGe_{1-w}:H_z$ | $SiO_2$ | $Si_wGe_{1-w}:H_y$ | $SiO_2$ |
|---|---|---|---|---|
| Layer | 1 | 2 | 3 | 4 |
| Thickness | 251.17 | 546.59 | 259.12 | 78.57 |
| Material | $\alpha\text{-}SiN_y:H_z$ | $SiO_2$ | $Si_wGe_{1-w}:H_y$ | $SiO_2$ |
| Layer | 5 | 6 | 7 | 8 |
| Thickness | 45.8 | 260.65 | 129.01 | 79.08 |
| Layer | 9 | 10 | 11 | 12 |
| Thickness | 405.59 | 176.63 | 512.64 | 199.39 |
| Layer | 13 | 14 | 15 | 16 |
| Thickness | 51.95 | 129.4 | 529.57 | 134.55 |
| Layer | 17 | 18 | 19 | 20 |
| Thickness | 83.33 | 92.16 | 516.39 | 231.92 |
| Layer | 21 | 22 | 23 | 24 |
| Thickness | 380.86 | 130.42 | 137.36 | 136.26 |
| Layer | 25 | 26 | 27 | 28 |
| Thickness | 52.8 | 63.74 | 259.88 | 559.97 |
| Material | $Si_wGe_{1-w}:H_y$ | $SiO_2$ | — | — |
| Layer | 29 | 30 | — | — |
| Thickness | 240.7 | 126.8 | — | — |

In the set of narrowband pass films, the material of the high refractive index film layer is $Si_wGe_{1-w}:H_z$, the material of the low refractive index film layer is $SiO_2$, and the material of the matching film layer is $\alpha\text{-}SiNy:Hz$. Layers 5 to 28 are structured in the form of $(L_2\text{-}L_3\text{-}L_1\text{-}L_3)^6$.

Table 6 provides a set of wideband pass films. Reference numerals 1-35 denotes the order in which each layer of the second set of films 53 is stacked in a direction away from the substrate 51. For example, "1" denotes the $1^{st}$ layer, which is the layer closest to the substrate 51 as described above.

TABLE 6

Layer structure of a set of wideband pass films (unit of thickness: nm)

| Material | $SiO_2$ | Si:H | $SiO_2$ | Si:H | $SiO_2$ | Si:H |
|---|---|---|---|---|---|---|
| Layer | 1 | 2 | 3 | 4 | 5 | 6 |
| Thickness | 32.42 | 27.09 | 92.93 | 37.22 | 83.78 | 75.25 |
| Layer | 7 | 8 | 9 | 10 | 11 | 12 |
| Thickness | 85.01 | 45.84 | 60 | 55.06 | 125.72 | 76.15 |
| Layer | 13 | 14 | 15 | 16 | 17 | 18 |
| Thickness | 60.96 | 45.69 | 63.42 | 65.25 | 117.06 | 72.66 |
| Layer | 19 | 20 | 21 | 22 | 23 | 24 |
| Thickness | 61.09 | 45.85 | 61.81 | 71.56 | 107.26 | 71.4 |
| Layer | 25 | 26 | 27 | 28 | 29 | 30 |
| Thickness | 61.87 | 47.55 | 52.23 | 73.93 | 131.17 | 69.77 |
| Layer | 31 | 32 | 33 | 34 | 35 | |
| Thickness | 50.78 | 37.72 | 89.25 | 89.18 | 93.91 | |

The passband width of the optical filter 5 is relatively narrow, the drift amount of the center wavelength of the passband is small, and the transmittance of the passband is relatively high.

However, it will be appreciated by those skilled in the art that the above examples are merely exemplary. The first set of films 52 and the second set of films 53 of the optical filter 5 may also have other layer structures, and the first set of films 52 or the second set of films 53 of the various examples may also be applied to other exemplary examples. Further, other transparent layers, such as an air cavity, may be provided outside the first surface and outside the second surface of the optical filter 5.

An example of the present disclosure further provides a method for manufacturing an optical filter which includes the following steps:

placing a to-be-coated piece and a target material at corresponding positions in a deposition chamber, wherein when the to-be-coated layer is a matching film layer, the target material includes silicon component and germanium component, and vacuumizing the deposition chamber, wherein a vacuum degree in the deposition chamber is a preset value;

introducing argon into the deposition chamber, wherein a flow rate of the argon is a preset value;

introducing hydrogen and oxygen into the deposition chamber, wherein a flow rate of the hydrogen is a preset value and a flow rate of the oxygen is less than 60 sccm; and forming layer on the to-be-coated piece, wherein a material of the layer includes the aforementioned nitrogen-doped silicon germanium mixture.

In an exemplary example, the vacuum degree in the deposition chamber is less than $5\times10^{-5}$ torr. The flow rate of argon is between 10 sccm and 300 sccm. The flow rate of hydrogen is less than 80 sccm.

An example of the present disclosure further provides an optical system including an infrared image sensor and the aforementioned optical filter 5. The optical filter 5 is arranged on a photosensitive side of the infrared image sensor.

Figure 6:
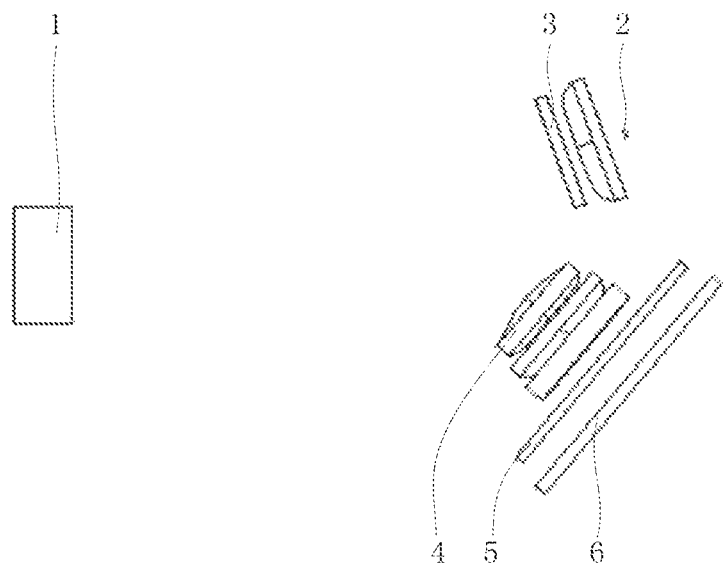
FIG. 6 shows a schematic structural diagram of an optical system according to an example of the present disclosure.

Referring to FIG. 6, the optical system includes an Infrared Radiation (IR) light source 2, a first lens assembly 3, a second lens assembly 4, an optical filter 5, and a three-dimensional sensor 6. The light emitted from the infrared light source 2 is irradiated to a surface of an object 1 through the first lens assembly 3. The light reflected from the surface of the object 1 is irradiated to the optical filter 5 through the second lens assembly 4. The ambient light is cut-off by the optical filter 5, while the infrared light or part of the red light transmitted through the optical filter 5 is irradiated to the photosensitive side of the three-dimensional sensor 6 to form image data for processing. The optical filter 5 has a low drift in center wavelength for inclined light in different directions, and the transmitted infrared signal-to-noise ratio is high, so that the resulting image quality is good.

The foregoing is only a description of the preferred embodiments of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the technology, such as, technical solutions formed by replacing the features as disclosed in the present disclosure with (but not limited to), technical features with similar functions.

What is claimed is:

1. An optical filter, characterized in that, the optical filter comprises a substrate and a first set of films disposed on a first surface of the substrate, wherein the first set of films comprises a high refractive index film layer, a low refractive index film layer, and a matching film layer;
  a material of the matching film layer comprises a nitrogen-doped silicon mixture having a chemical formula $SiN_y$, a nitrogen-doped germanium mixture having a chemical formula $GeN_y$, or a nitrogen-doped silicon germanium mixture having a chemical formula $Si_xGe_{1-x}N_y$, wherein $0<x<1$, and $0<y\leq0.1$;
  wherein, in a wavelength range from 780 nm to 3000 nm, a refractive index of the high refractive index film layer is greater than a refractive index of the low refractive index film layer, and a refractive index of the matching film layer is not equal to a refractive index of its adjacent film layer;
  wherein along a direction away from the substrate, the first set of films has a structure in one of the following forms:
  $(L_3-L_1-L_3-L_2)^s-L_3-L_1$;
  $(L_1-L_3)^2-(L_2-L_3-L_1-L_3)^s-L_1-L_3$;
  $(L_1-L_3)^s-(L_2-(L_1-L_3)^p-L_1-L_2)^q-(L_1-L_3)^rL_1$;
  $(L_3-L_1)^s-(L_2-(L_1-L_3)^p-L_1-L_2)^q-(L_3-L_1)^rL_3-L_1-(L_2-(L_1-L_3)^t-L_1-L_2)^n$; or
  $(L_3-L_1)^s-(L_3-L_1)^rL_3-(L_2-(L_1-L_3)^p-L_1-L_2)^q-(L_3-L_1)^rL_3-(L_2-(L_1-L_3)^t-L_1-L_2)^n-(L_3-L_1)^r$,
  in the structural of the first set of films, $L_1$ represents the high refractive index film layer, $L_3$ represents the low refractive index film layer, $L_2$ represents the matching film layer, p, q, r, and s represent a number of repetitions of a structure in parentheses, wherein p, q, r, and s are integers greater than or equal to 0.

2. The optical filter according to claim 1, characterized in that, the optical filter has a passband within a wavelength range of 780 nm to 1200 nm, and a drift amount of a center wavelength of the passband is not greater than 16 nm when an incident angle of light changes from 0° to 30°.

3. The optical filter according to claim 2, characterized in that, the passband of the optical filter has a center wavelength corresponding to a p light and a center wavelength corresponding to a s light, and when the incident angle of light is 30°, a drift between the center wavelength corresponding to the p light and the center wavelength corresponding to the s light is not greater than 5 nm.

4. The optical filter according to claim 2, characterized in that, an average transmittance of the passband of the optical filter is not less than 93%.

5. The optical filter according to claim 1, characterized in that, the refractive index of the high refractive index film layer is greater than 3, the refractive index of the low refractive index film layer is less than 3, and the refractive index of the matching film layer is between 1.7 and 4.5 in a wavelength range from 780 nm to 1200 nm.

6. The optical filter according to claim 1, characterized in that, the nitrogen-doped silicon mixture is further doped with hydrogen and has a chemical formula $SiN_y:H_z$, wherein at least a part of the $SiN_y:H_z$ is an amorphous hydrogenated nitrogen-doped silicon mixture $\alpha-SiN_y:H_z$;
  the nitrogen-doped germanium mixture is further doped with hydrogen and has a chemical formula $GeN_y:H_z$, wherein at least a part of the $GeN_y:H_z$ is an amorphous hydrogenated nitrogen-doped germanium mixture $\alpha-GeN_y:H_z$; and
  the nitrogen-doped silicon germanium mixture is further doped with hydrogen and have has a chemical formula $Si_xGe_{1-x}N_y:H_z$, wherein at least a part of the $Si_xGe_{1-x}N_y:H_z$ is an amorphous hydrogenated nitrogen-doped silicon germanium mixture $\alpha-Si_xGe_{1-x}N_y:H_z$;
  wherein $z\leq1$.

7. The optical filter according to claim 1, characterized in that, the nitrogen-doped silicon germanium mixture further comprises an auxiliary component, wherein the auxiliary component comprises one or more of oxygen, boron, or phosphorus, and a ratio of a number of each atom in the auxiliary component to a number of silicon atoms is less than 10%.

8. The optical filter according to claim 1, characterized in that, a material of the high refractive index film layer comprises $Si_wGe_{1-w}:H_v$, wherein $0\leq w\leq1$, and $0\leq v\leq1$.

9. The optical filter according to claim 1, characterized in that, a material of the low refractive index film layer comprises a mixture of one or more of $SiO_2$, $Si_3N_4$, $Ta_2O_5$, $Nb_2O_5$, $TiO_2$, $Al_2O_3$, SiCN, or SiC.

10. The optical filter according to claim 4, characterized in that, the substrate further comprises a second surface facing away from the first surface, wherein the optical filter further comprises a second set of films disposed on the second surface of the substrate;
  the second set of films is a set of longwave pass films or a set of wideband pass films, and the first set of films is a set of narrowband pass films, wherein a passband of the second set of films covers a passband of the first set of films.

11. The optical filter according to claim 10, characterized in that, a sum of a thickness of the first set of films and a thickness of the second set of films is less than 12 μm.

12. The optical filter according to claim 10, characterized in that, the second set of films is the set of longwave pass films, wherein in a wavelength range of 350 nm to 1200 nm, the set of narrowband pass films has a passband, the set of longwave pass films has a passband and a cut-off band, and the passband of the set of longwave pass films covers the passband of the set of narrowband pass films; and
  a blocking of the cut-off band of the set of longwave pass films is not lower than a blocking of a corresponding band of the set of narrowband pass films.

13. The optical filter according to claim 10, characterized in that, the second set of films is the set of wideband pass films, wherein in a wavelength range of 780 nm to 1200 nm, the set of narrowband pass films has a passband, the set of wideband pass films has a passband, and the passband of the set of wideband pass films covers the passband of the set of narrowband pass films; and in a wavelength range less than 780 nm, an average blocking of the set of wideband pass films is not lower than an average blocking of the set of narrowband pass films.

\* \* \* \* \*